July 27, 1943.    R. E. BAUER    2,325,170
MEASURING GAUGE
Filed June 29, 1942
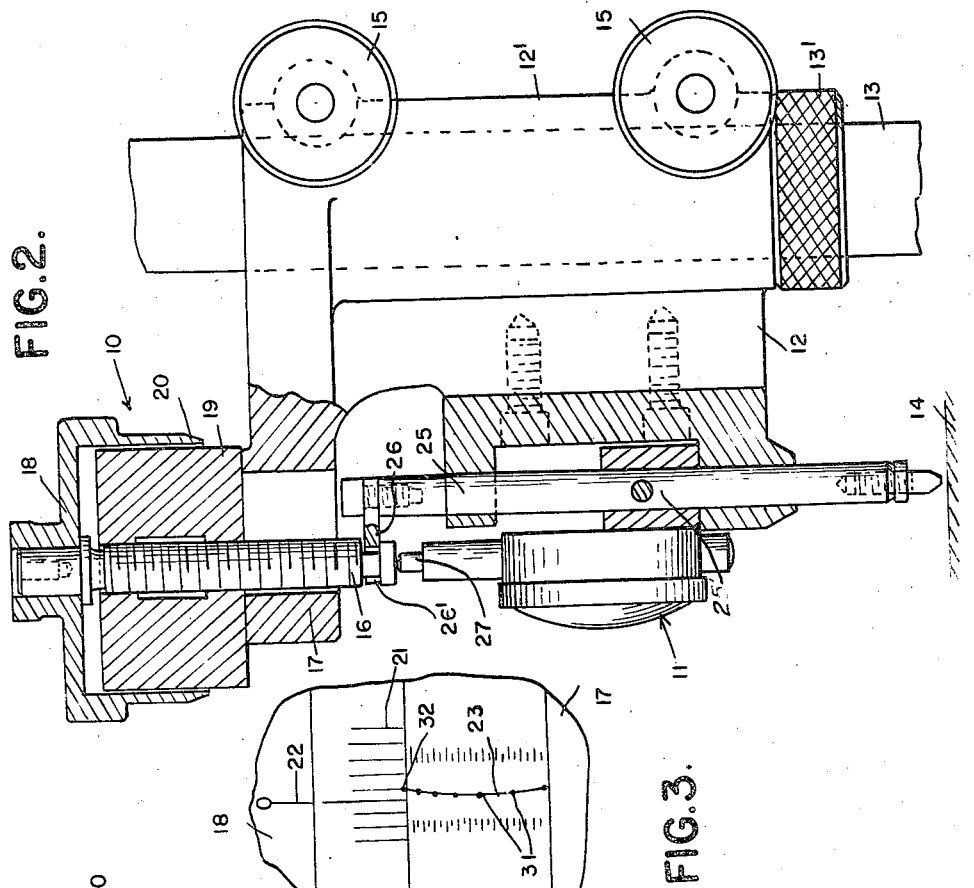
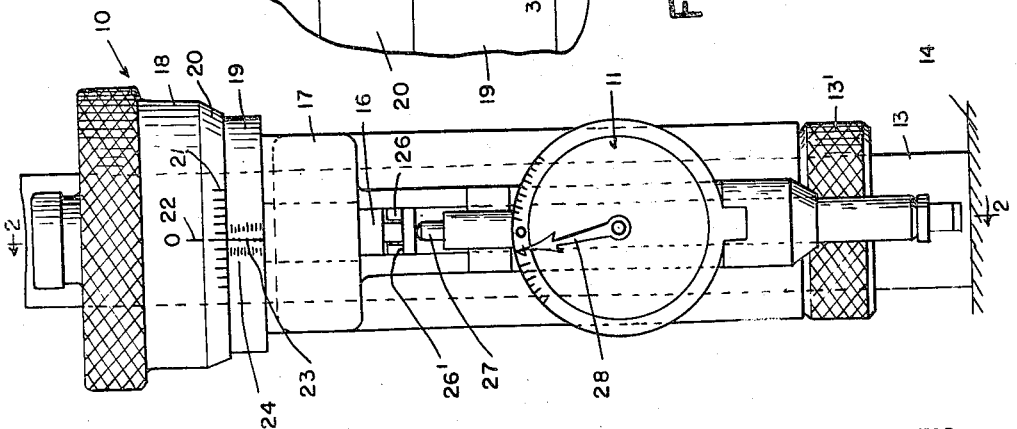
INVENTOR.
RUSSELL E. BAUER
ATTORNEYS

Patented July 27, 1943

2,325,170

UNITED STATES PATENT OFFICE 2,325,170

MEASURING GAUGE

Russell E. Bauer, Detroit, Mich.

Application June 29, 1942, Serial No. 448,972

3 Claims. (Cl. 33—147)

This invention relates to improvements in gauges of the type employed to measure accurate machine work and also contemplates a method of calibrating the gauge.

The principal object of this invention is to provide a gauge which contributes materially to increasing the production of precision machine parts by simplifying manipulation of the gauge and by reducing the time required to accurately measure the work.

Another feature of the present invention is to provide a gauge composed of a relatively few simple parts capable of being readily manipulated to directly indicate any variation between the work being measured and the specified dimension of the work.

A further object of this invention is to provide a gauge possessing the above advantages and capable of very accurately measuring a wide variety of dimensions.

Still another object of this invention is to provide a gauge having a micrometer and an indicator combined in such a manner that after the micrometer is once set to the specified dimension of the parts produced, the difference between the specified dimension and the actual dimension of the parts may be read directly from the indicator without changing or manipulating the micrometer. This feature is important because it not only reduces the possibility of error to a minimum but also facilitates production of precision parts.

In addition to the foregoing, the present invention contemplates a relatively simple and effective method for calibrating the gauge to compensate for variations in the lead of the micrometer screw forming a part of the gauge.

The foregoing, as well as other objects, will be made more apparent as this description proceeds, especially when considered in connection with the accompanying drawing wherein:

Figure 1 is a front elevational view of a measuring gauge constructed in accordance with this invention;

Figure 2 is a fragmentary sectional view taken substantially on the plane indicated by the line 2—2 of Figure 1; and Figure 3 is a semi-diagrammatic exaggerated view illustrating the method of calibrating the gauge.

In general, the measuring gauge forming the subject matter of this invention comprises a micrometer 10 and a dial indicator 11 combined in such a manner that, during use, the difference between the dimension of the work being measured and the specified dimension is directly readable on the dial indicator 11. This indicator is of the usual spring operated type but is preferably designed and calibrated to amplify the reading representing the difference between the actual dimension of the work and the specified dimension so that this difference may be quickly noted.

Upon reference to Figure 2 it will be noted that the micrometer 10 and the dial indicator 11 are both mounted on a slide 12 having a vertically split clamp 12'. The clamp 12' is mounted on a vertical stanchion 13 and is adapted to be secured to the stanchion in any one of several vertical positions with respect to a work supporting anvil 14 by means of clamping screws 15 which extend through the split portion of the clamp. The clamp and accordingly the slide may be accurately adjusted with respect to the anvil by means of a collar 13' threaded on the stanchion directly beneath the clamp in engagement with the lower end of the clamp. As a result of the above construction, a wide variety of dimensions may be accurately measured with the gauge and the elevation of the micrometer relative to the anvil may be accurately determined.

The micrometer 10 comprises a vertical spindle 16 having fine threads thereon and adapted to threadedly engage a fixed part 17 of the slide 12. A sleeve 18 is secured to the upper end of the spindle 16 for rotating the latter and a head 19 is fixedly supported on the slide 12 in a manner to extend into the lower end of the sleeve 18.

Upon reference to Figure 1 it will be noted that the exterior surface of the sleeve 18 is tapered inwardly at the lower end of the sleeve to provide a surface 20 for receiving the scale 21. The calibrations of the scale extend circumferentially of the surface 20 from the zero reference line 22 and represent predetermined increments of a unit of measure, such as the inch.

The calibrations on the scale 21 successively register with a reference line 23 formed on the head 19 and, in accordance with conventional practice, a vertical scale 24 is applied to the head 19 for coaction with the lower edge of the micrometer sleeve 18. The two scales are readable in the orthodox manner to determine the extent of axial adjustment of the micrometer spindle 16.

Referring again to Figure 2 of the drawing, it will be noted that work engaging means in the form of a vertical rod 25 is slidably supported on the slide 12 to one side of the micrometer spindle 16. An arm 26 is secured at one end to the upper end of the rod 25 and the free end of the arm engages in an annular groove 26' formed in the lower end of the spindle 16. For reasons to be presently set forth, the width of the groove 26' exceeds the thickness of the free end of the arm by a predetermined amount so that the rod 25 may slide vertically relative to the micrometer spindle. In other words, the upper end of the rod 25 has a lost motion connection with the micrometer screw 16 and this is important in that it is largely responsible in eliminating the necessity of manipulating the micrometer each time it is desired to check the dimension of a part.

In accordance with this invention the dial indicator 11 is actually operated by the micrometer spindle 16 to indicate the extent of movement of the work engaging rod 25 relative to the micrometer spindle 16. For accomplishing this result the dial indicator 11 actually forms a part of the work engaging means and, in the present instance, is fixed to the rod 25 by a bushing 25' in such a position that the spring operated plunger 27 of the indicator is directly in alignment with the spindle 16 and abuts the lower end of this spindle.

As shown particularly in Figure 1, the dial indicator has a pointer 28 operatively connected to the plunger 27 in the usual manner by a spring operated rack and a pinion mechanism, not shown herein. The face of the dial is graduated to indicate fractions of an inch and the scale is numbered in both directions from the zero point in order to give both plus and minus readings.

In order to initially adjust the gauge to check the desired work pieces, the dial indicator 11 is adjusted vertically on the rod 25 so that the pointer 28 indicates approximately .004 of an inch under zero when the lower end of the rod 25 is free from engagement with the anvil 14. In other words, the initial adjustment is such as to enable the rod 25 to move upwardly relative to the micrometer spindle 16 approximately .004 of an inch before the pointer 28 on the dial indicates zero. In the present instance, the annular groove 26' in the lower end of the micrometer spindle 16 allows approximately .025 of an inch vertical movement of the dial indicator 11 relative to the micrometer. As a result, the gauge will measure from approximately .004 of an inch undersize to approximately .021 of an inch oversize. It will, of course, be understood that these dimensions are merely given for the purpose of illustration and may be varied to suit different conditions.

Assuming now that it is desired to measure a work piece that is supposed to be exactly .250 of an inch in diameter, the micrometer is first adjusted to its zero position. The slide 12 is then adjusted vertically by manipulating a threaded collar 13' on the stanchion 13 until the lower end of the rod 25 contacts the anvil 14 and raises the attached indicator 11 relative to the micrometer spindle 16 to the extent required for the pointer 28 to indicate the zero position. The slide 12 is then clamped on the stanchion by manipulating the clamping screws 15.

In the event the dial indicator does not read zero upon completion of the above operations, the rim of the dial indicator is rotated in the proper direction to accurately position the zero point in registration with the pointer 28. When this operation is accomplished, the gauge is properly adjusted or, in other words, the micrometer 10 reads zero, the dial indicator also reads zero and the lower end of the rod 25 is in contact with the anvil 14.

The micrometer 10 is then adjusted to read .250 of an inch and the part to be measured or checked is placed on the anvil beneath the end of the rod 25. It may be pointed out at this time that when the micrometer is adjusted to read .250 of an inch or, in other words, to read the specified dimension of the part to be checked, the dial indicator returns to its initial position wherein the pointer indicates approximately .004 of an inch under zero. In other words, the rod 25 with the attached indicator 11 thereon is in effect lowered so that when the work piece is inserted beneath the rod, the latter is raised relative to the micrometer spindle 16. Of course, raising the rod 25 effects a corresponding upward movement of the dial indicator 11 and, since the upper end of the plunger 27 abuts the lower end of the micrometer spindle 16, it follows that the pointer 28 of the dial indicator 11 moves toward the zero point. If the pointer 28 actually registers with the zero point, the dimension of the work is exactly equal to the specified dimension represented by the micrometer setting. On the other hand, if the pointer 28 does not quite reach the zero point, it follows that the work is undersize by an amount readable directly from the scale on the indicator. If the pointer 28 moves beyond the zero point, then the work is oversize by the amount also readably directly from the scale on the indicator.

It follows from the above that all of the work pieces produced may be quickly and accurately checked without any further manipulation of the micrometer 10. This is, of course, advantageous because it not only reduces the possibility of error to a minimum but also facilitates production of the parts.

In order to obtain precision measurements, it is desirable to compensate for any inaccuracies that may be present in the lead of the micrometer screw and this is accomplished herein in the following manner. In detail, a gauge block of predetermined size is positioned on the anvil 14 and the micrometer is adjusted until the lower end of the work engaging rod 25 engages the block. The head 19 is then marked opposite the reference line 22 in the manner indicated by the reference character 31 in the exaggerated view, Figure 3. This operation is repeated with gauge blocks of progressively increasing dimension and the resulting points 31 are connected by the reference line 23. As a result of this procedure, the zero point 32 is accurately established on the micrometer head regardless of slight inaccuracies that may be present in the micrometer screw.

What I claim as my invention is:

1. A measuring gauge comprising, a micrometer having an adjustable spindle, a work engaging member supported to one side of the axis of the spindle and connected to the spindle for limited sliding movement relative thereto, and a dial indicator movable as a unit with the work engaging member and having an actuating element abutting the spindle for operation thereby.

2. A measuring gauge comprising, a micrometer having an adjustable spindle, a work engaging member in the form of a rod supported to one side of the spindle in parallel relation to the latter and having one end engageable with the work to be measured, a connection between the opposite end of the rod and spindle enabling limited sliding movement of the rod relative to the spindle by the work to be measured, and an indicating dial secured to the rod and having an actuating plunger engageable with the spindle for operation thereby.

3. A measuring gauge comprising a vertical stanchion having threads thereon, a slide having a vertically split clamp mounted on the stanchion and adapted to be secured to the stanchion at any one of a number of vertically spaced points, an adjustable collar threaded on the stanchion below the clamp and forming an abutment for the latter, a micrometer carried by the slide and having a vertically adjustable spindle, a vertically disposed work engaging member supported to one side of the spindle and having the upper end connected to the spindle for limited sliding movement relative to the latter, and an indicating dial secured to the work engaging member and having an operating plunger positioned directly beneath the lower end of the spindle in engagement with the latter for operation thereby.

RUSSELL E. BAUER.